(12) United States Patent
Griffith

(10) Patent No.: US 7,729,430 B2
(45) Date of Patent: Jun. 1, 2010

(54) AUTODETECT FEATURE FOR A SPACEWIRE APPLICATION

(75) Inventor: J. Steve Griffith, Colorado Springs, CO (US)

(73) Assignee: Aeroflex Colorado Springs Inc., Colorado Springs, CO (US)

( * ) Notice: Subject to any disclaimer, the term of this patent is extended or adjusted under 35 U.S.C. 154(b) by 947 days.

(21) Appl. No.: 11/456,488

(22) Filed: Jul. 10, 2006

(65) Prior Publication Data

US 2008/0008277 A1 Jan. 10, 2008

(51) Int. Cl.
*H04L 27/00* (2006.01)
(52) U.S. Cl. .................................. 375/259; 370/228
(58) Field of Classification Search ................. 375/220, 375/229, 259; 370/225, 227–228, 216, 241, 370/537
See application file for complete search history.

(56) References Cited

U.S. PATENT DOCUMENTS

| 6,334,947 | B1 * | 1/2002 | De Boer et al. | ........ | 208/111.25 |
| 6,522,689 | B1 * | 2/2003 | Heinrich | ...................... | 375/224 |
| 7,127,669 | B2 * | 10/2006 | Platenberg et al. | .......... | 714/820 |
| 2005/0058063 | A1 | 3/2005 | Masuyama et al. | | |
| 2006/0033650 | A1 | 2/2006 | Leung et al. | | |
| 2007/0011587 | A1 * | 1/2007 | Platenberg et al. | .......... | 714/774 |

FOREIGN PATENT DOCUMENTS

WO WO 97/31441 A1 8/1997

OTHER PUBLICATIONS

ECSS-E-50-12A, Space engineering, SpaceWire—Links, nodes, routers and networks, European Cooperation for Space Standardization, The Netherlands, Jan. 24, 2003, pp. 1-124.

* cited by examiner

*Primary Examiner*—Jean B Corrielus
(74) *Attorney, Agent, or Firm*—Peter J. Meza; William J. Kubida; Hogan & Hartson LLP

(57) ABSTRACT

An autodetect circuit for a router system includes an interface to two bidirectional serial links, an input multiplexer circuit coupled to one side of the link interface for receiving input data signals and clock signals, a receiver coupled to the input multiplexer circuit and to a receive FIFO, a state machine coupled to the receiver, a transmitter coupled to the state machine, a transmit FIFO, and to the other side of the link interface for transmitting output data, and a counter coupled to the state machine for controlling the input multiplexer circuit. The autodetect circuit determines which of the two links "A" or "B" is active and available for transmission. The counter is incremented whenever a link reset occurs. When the count reaches a predetermined maximum count value, a port enable signal is toggled from the default "A" link to the "B" link. When one port is enabled, any activity on the other port is ignored.

22 Claims, 6 Drawing Sheets

US 7,729,430 B2

AUTODETECT FEATURE FOR A SPACEWIRE APPLICATION

BACKGROUND OF THE INVENTION

The present invention is related to a router network for space applications. More particularly, the present invention is related to an autodetect circuit for determining which of two links of a node in the router network is active and available for data transmission.

SpaceWire is the common name associated with the European Cooperate for Space Standardization Specification ECSS-E-50-12A. The use and/or implementation of the autodetect circuit are not specifically mentioned in the standard and are left up to the discretion of the designers and suppliers.

Prior autodetect circuits for servicing two transmission links have been developed for other standards and typically involve the duplication of many of the circuits used for just a single link.

What is desired is an autodetect circuit that can minimize the duplication of logic and simplify the circuit involved in prior art autodetect circuits.

SUMMARY OF THE INVENTION

According to an embodiment of the present invention, an autodetect circuit for a router system includes an interface to two bidirectional serial links, an input multiplexer circuit coupled to one side of the link interface for receiving input data signals and clock signals, a receiver coupled to the input multiplexer circuit and to a receive FIFO, a state machine coupled to the receiver, a transmitter coupled to the state machine, a transmit FIFO, and to the other side of the link interface for transmitting output data, and a counter coupled to the state machine for controlling the input multiplexer circuit.

If enabled, the link autodetect circuit determines which of the two links "A" or "B" is active and available for SpaceWire transmissions. The link initialization state machine is modified to implement the autodetect feature using a minimum of logic gates. The counter is incremented whenever a link reset occurs. When the count reaches two or three, a port enable signal is toggled from the "A" link, which is the default condition, to the "B" link. This "port enable" signal is sent to the receiver block and used to multiplex the two extracted clocks and the two serial data pairs received from two independent serdes (Serializer-Deserializer) blocks. When one port is enabled, any activity on the other port is ignored.

According to the design and structure of the present invention, implementation of the autodetect circuit on an FPGA is more easily realizable. While the autodetect circuit is ideally used in a router network for space applications, it can also be in a wide range of ASIC applications.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION

Figure 1:
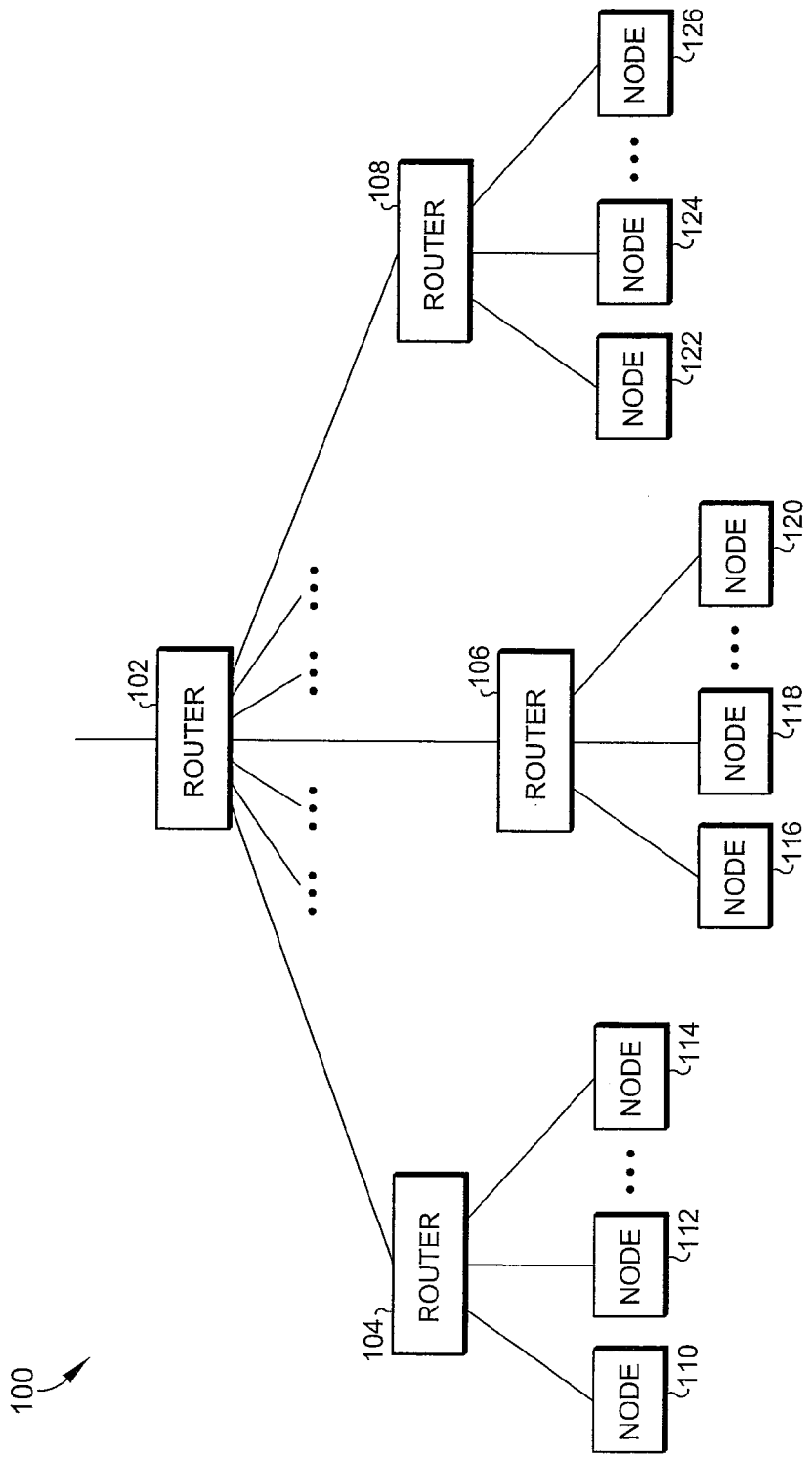
FIG. 1 is a schematic diagram of a typical prior art routing network including a plurality of routers, nodes, and links.

Referring now to FIG. 1, a network 100 suitable for use in conjunction with the autodetect circuit of the present invention is made up of a number of links, nodes 110-126, and routing switches 102-108. The nodes are the sources and destinations of data packets. For example, a processor is a type of network node. Links between the routers and the nodes provide the means for passing the data packets between one node and another. Nodes can be either directly connected by links or connected via routing switches as can be seen in FIG. 1. Usually a node only supports one link and so, can only be directly coupled to one other node or a router. Typical link connections are shown in FIG. 1. The present invention pertains to an autodetect circuit for transmitting information over a single link that is part of a two link (primary, redundant) pair. Routing switches connect together many nodes and provide a means of routing packets from one node to one of many other possible nodes. Those skilled in the art will understand that the routing network of FIG. 1 is only a portion of a, network, and that there are many other network configurations possible.

Figure 2:
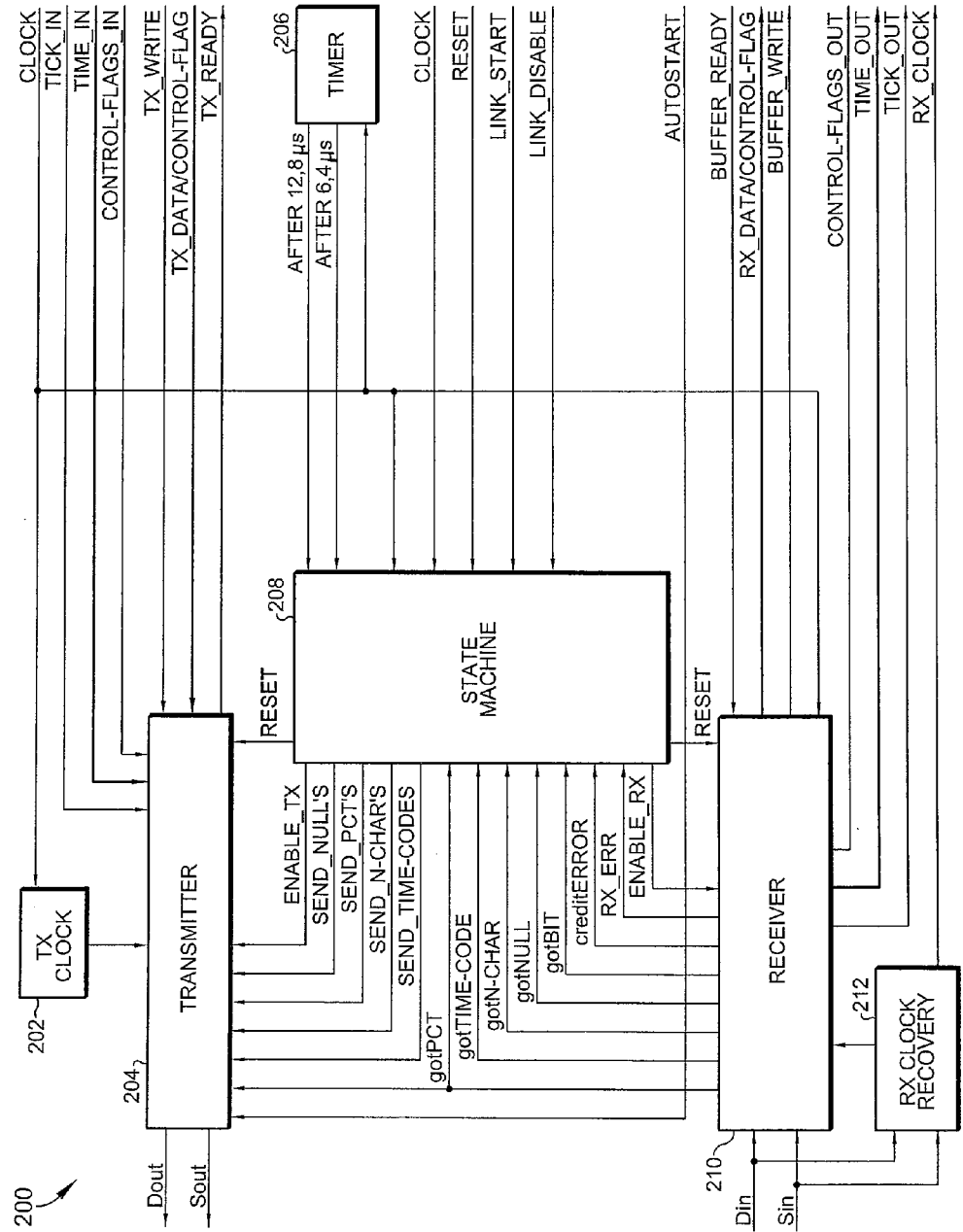
FIG. 2 is a block diagram of an encoder/decoder circuit used in a node in a SpaceWire router network.

Referring now to FIG. 2, an example of a SpaceWire encoder-decoder 200 is shown suitable for use in a node as shown in FIG. 1. Encoder-decoder 200 includes a transmit clock block 202, a transmitter 204, a timer block 206, a state machine 208, a receiver 210, and a clock recovery block 212. Transmitter 204 is responsible for encoding data and transmitting it. The transmit clock block 202 is responsible for producing the variable data signaling clock signals used by the transmitter. The transmit clock signals are typically derived by dividing down the local system clock, or a phase locked loop multiple of the local system clock. The receiver 210 is responsible for decoding the Din and Sin signals to produce a data sequence that is passed on to the host system. The receive clock recovery block 212 is responsible for recovering the receive clock signal by simply XORing the received Data and Strobe signals together. The receive clock recovery circuit 212 provides all the clock signals used by the receiver 210 with the exception of the local clock signal used for disconnect timeout. The state machine 208 controls the overall operation of the link interface, as is explained in further detail below. State machine 208 provides link initialization, normal operation and error recovery services. Timer block 206 provides the After 6.4 µs and 12.8 µs timeouts used in link initialization.

Figure 3:
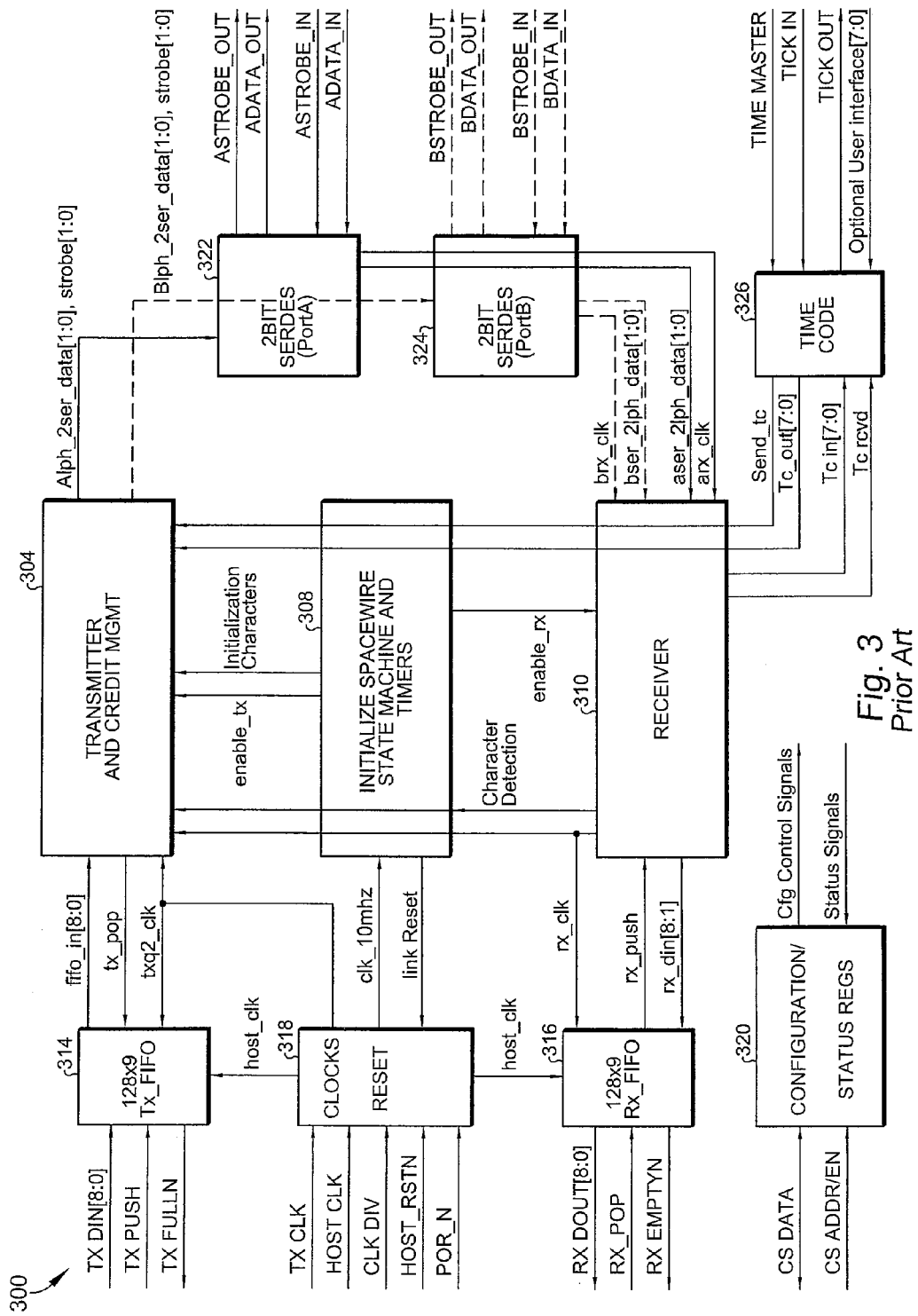
FIG. 3 is a somewhat more detailed schematic diagram of the encoder/decoder circuit shown in FIG. 2, including additional blocks such as transmit and receives FIFOs, and serdes blocks for the "A" and "B" ports.

Referring now to FIG. 3, the encoder-decoder 300 is shown in somewhat more detail, in that additional functional blocks are shown. Encoder-decoder 300 includes transmitter 304, state machine 308, receiver 310, as well as transmit FIFO 314, receive FIFO 316, clocks/reset block 318, configuration/status block 320, port "A" serdes block 322, port "B" serdes block 324, and time code block 326. The serdes blocks 322 and 324 contain high speed drivers and logic required to meet the 132 mbps bit rates for SpaceWire serial data. The receive FIFO 316 provides an interface between the captured SpaceWire data and the local host. The transmit FIFO 314 is a mirror of the receive FIFO 316. The transmit FIFO 314 provides an interface between the local hosts data-to-send (SpaceWire packets) and the transmitter 304. The configuration and status block 320 provides the ability to monitor status and to set various configuration via software.

Figure 4:
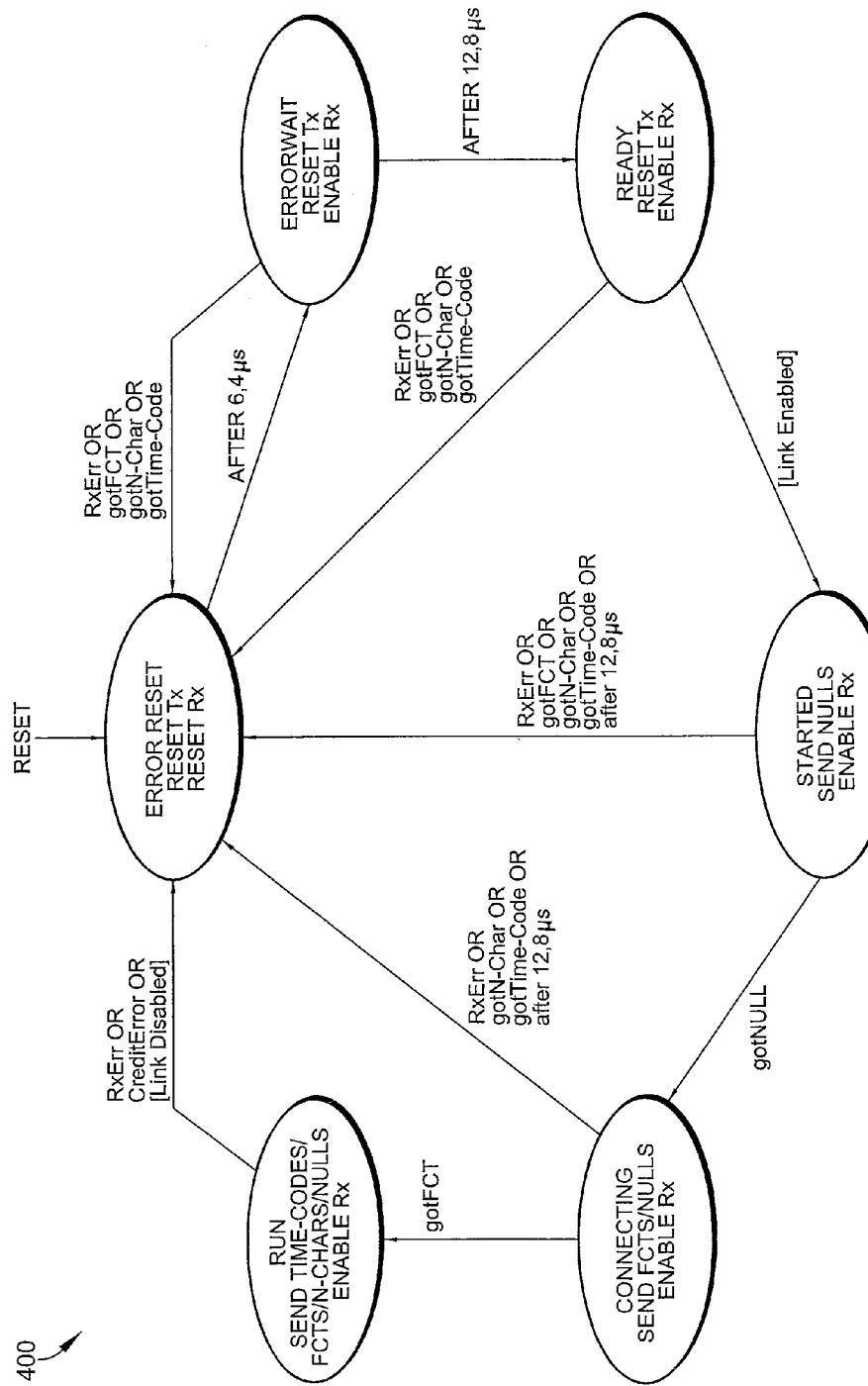
FIG. 4 is a state diagram of the state machine used in the single link prior art router systems, as well as in conjunction with the two link router system and autodetect circuit of the present invention.

Link initialization is provided by the state machine as described above. A state diagram 400 for the state machine is shown in FIG. 4. After power-on reset, the state machine sequences through the states as shown in FIG. 4. In the ErrorReset state, the state machine waits for 6.4 μs before transitioning the link (in a single link router system)to the ErrorWait state. If the receiver receives anything other than NULL characters in this state, a transition back to the ErrorReset state occurs, otherwise the link stays in ErrorWait for 12.8 μs. After the ErrorWait quiet time of 12.8 μs, the link transitions to the Ready state. The link stays in the Ready state until enabled. While in the Ready state, a move back to the ErrorReset state can occur if any non-NULL characters are detected. When enabled, the link transitions from the Ready to the Started state, and releases the transmitter to send NULL characters. The link returns all the way back to the ErrorReset state if NULL characters are not received before a 12.8 μs timeout, or if any non-NULL character is received. If a NULL character is detected before the 12.8 μs expires, the link transitions to the Connecting state. In the Connecting state, the link is enabled to send/receive flow control tokens (FCTs) and credit count monitoring begins. Once an FCT is received, the link finally transitions to the Run state. If no FCT is received before another 12.8 μs timeout occurs, the link returns all the way back to the ErrorReset state. Once in the Run state, the link can transmit and receive all SpaceWire characters.

Figure 5:
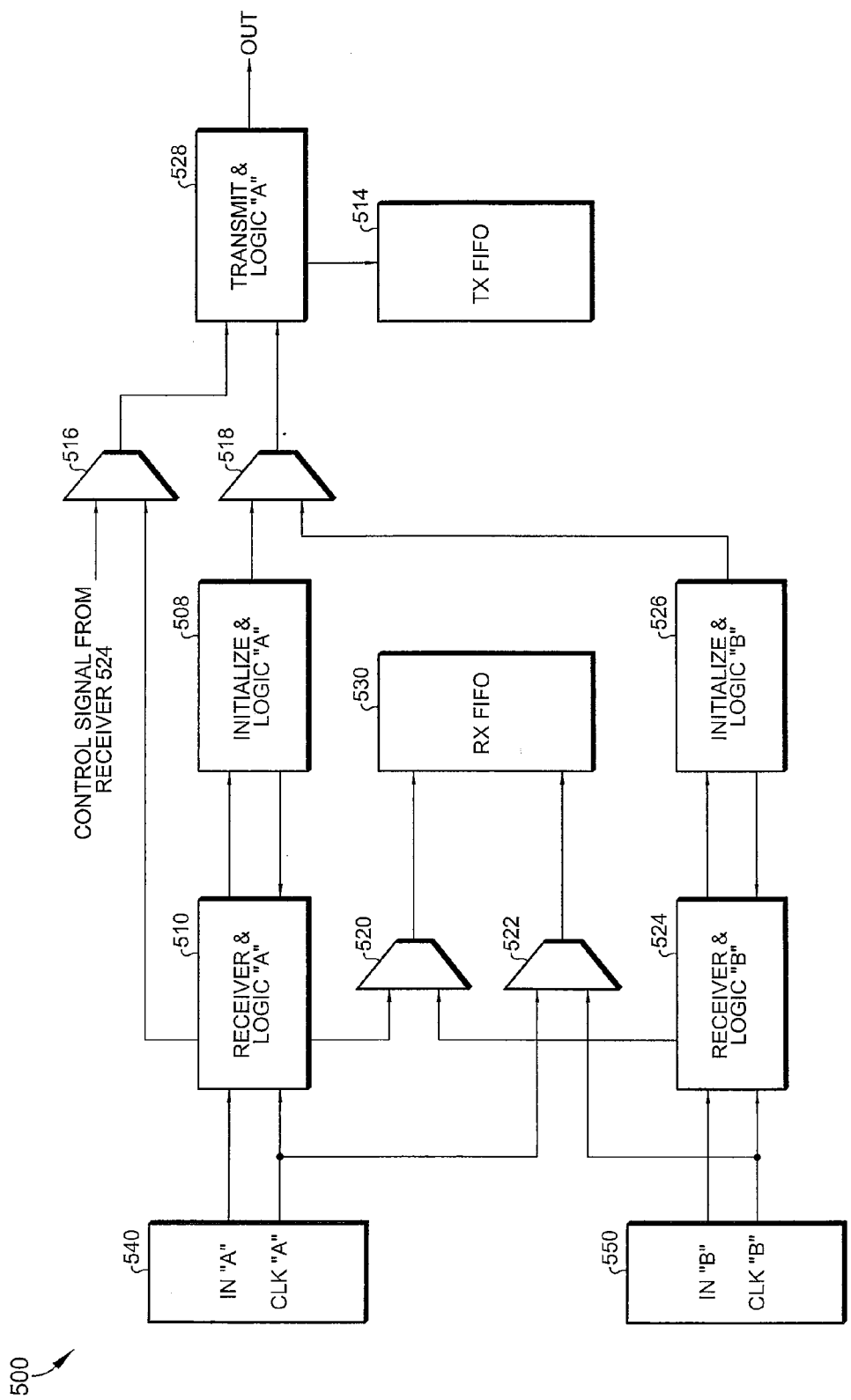
FIG. 5 is a block diagram of a prior art autodetect circuit for use in a two link router system application.

A prior art autodetect circuit 500 for a two-link router system is shown in FIG. 5. The autodetect circuit 500 includes a first data input IN "A" and a first clock input CLK "A" from interface/serdes "A" 540, and a second data input IN "B" and a second clock input CLK "B" from interface/serdes "B" 550. Autodetect circuit 500 also includes first and second receivers 510 and 524, multiplexers 520 and 522, initialization blocks 508 and 526, multiplexers 516 and 518, transmitter 528, receive FIFO 530, and transmit FIFO 514. Depending on which of the two links is enabled, multiplexer 520 couples receiver 510 to receive FIFO 530, or multiplexer 522 couples receiver 524 to receive FIFO 530. Similarly, depending on which of the two links is enabled, multiplexer 516 couples receiver 510 to transmitter 528, or multiplexer 518 couples receiver 524 to transmitter 528. The configuration of circuit 500, while suitable for handling the data and clock signals of a two-link router system, does so at the expense of duplicating the receive and state machine/initialization blocks.

Figure 6:
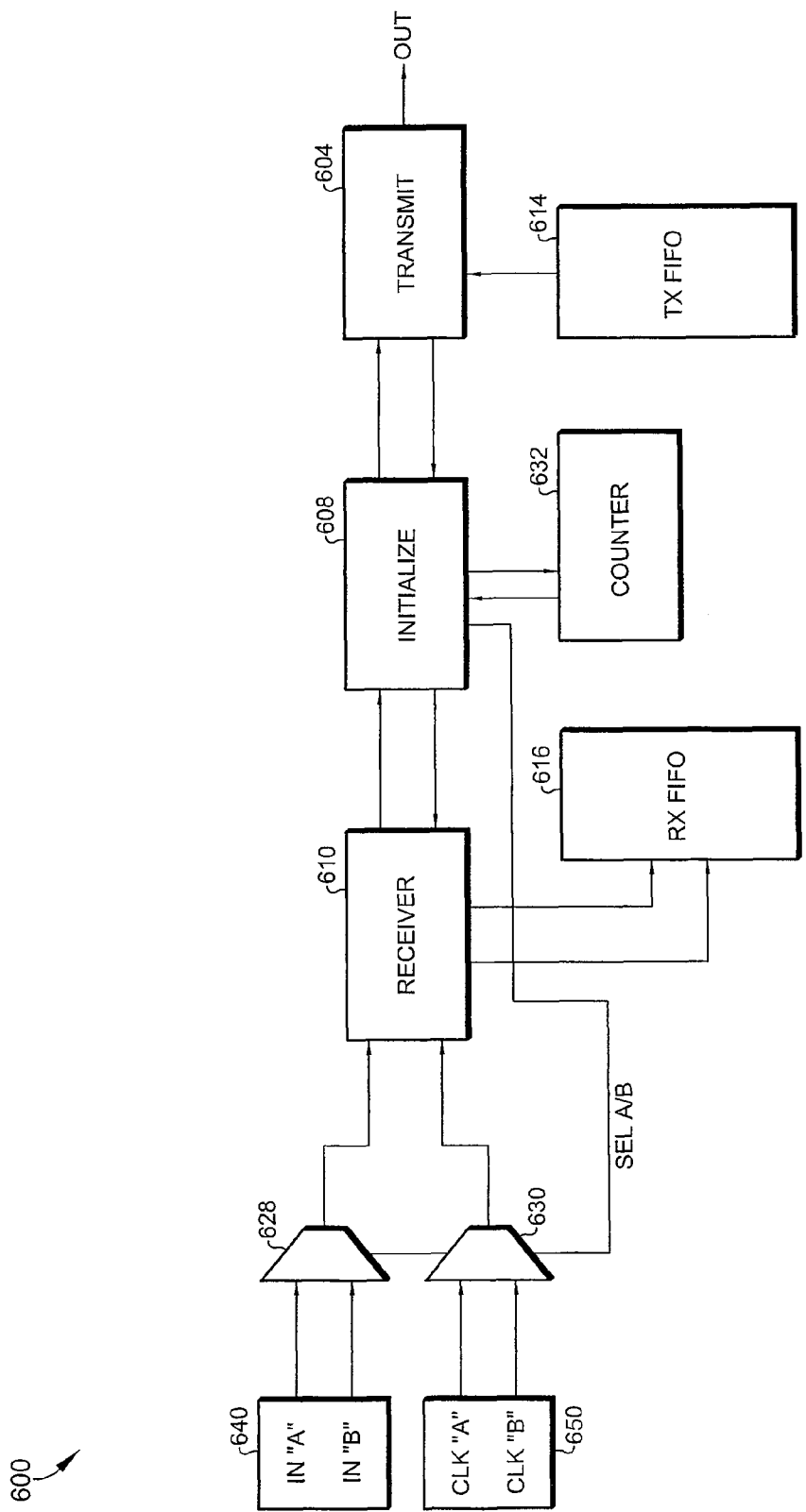
FIG. 6 is a block diagram of an autodetect circuit for use in a two link router system according to the present invention, including a counter block for controlling the state of two input multiplexers.

An autodetect circuit 600 for a two-link router system according to the present invention is shown in FIG. 6. The autodetect circuit 600 includes a first data input IN "A" and a second data input IN "B" from serdes 640, and a first clock input CLK "A" and a second clock input CLK "B" from serdes 650. Autodetect circuit 600 also includes receiver 610, multiplexers 628 and 630, initialization blocks 608, transmitter 604, counter 632, receive FIFO 616, and transmit FIFO 614. The autodetect circuit 600 of the present invention eliminates two multiplexers, as well as duplication of the receivers and state machines.

In operation, the initialization states in the state machine are sequenced on one of the links until the Run state is entered or until a link initialization error is encountered. If a link initialization error as defined in the ECSS-E-50 Specification occurs a specified number of times, such as two or three, counter 632, which counts the number of initialization errors, switches from the default link "A" to link "B" and the initialization process is attempted on the new "B" link and vice versa ("B" to "A") until linked or disabled. This involves a slight modification of the ErrorReset state, as explained below. It is important to note that while a count of "two or three" is mentioned, any number such as four, five, or even ten can be used for the maximum predetermined count value can be used as desired.

The State Machine is modified to include outputs for incrementing and resetting the counter, and another output that controls the multiplexers 630 and 628. The increment signal asserts whenever there is a transition from any state back to the ErrorReset state. The multiplexer control signal switches from "A" to "B" or vice versa when there is a transition back to the ErrorReset State and the counter has incremented to the maximum value. The counter reset asserts at power-on, or when the multiplexer control signal toggles, or when the state machine transitions into Run state.

The present invention describes an interface to the two serial links (the serdes). The manner of implementation for this serdes is one in which the clock produced (or extracted) is derived from the serial data using a technique commonly known as data-strobe encoding. This method of extracting the clock can produce so-called race conditions since the data is captured by the clock which was created from the data. Race conditions cause problems when a data change "beats" a clock change. Such a condition can be more prevalent in the present invention due to the multiplexing of the clocks at multiplexer 630. To mitigate this, the multiplexed clock output is inverted before being used to capture the corresponding data.

While there have been described above the principles of the present invention, in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of, or in addition to, features already described herein. Although claims have been formulated in this application to particular combinations of features, it should be understood that the scope of the disclosure herein, also includes any novel feature or any novel combination of features disclosed either explicitly or implicitly, or any generalization or modification thereof, which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

I claim:

1. An autodetect circuit comprising:
   an interface to two serial links;
   an input multiplexer circuit coupled to one side of the interface;
   a receiver coupled to the input multiplexer circuit;

a state machine coupled to the receiver;
a transmitter coupled to the state machine link for transmitting output data; and
a counter coupled to the state machine for controlling the input multiplexer circuit.

2. The autodetect circuit of claim 1, wherein the input multiplexer circuit comprises a first multiplexer for receiving a first data signal and a second data signal.

3. The autodetect circuit of claim 2, wherein the input multiplexer circuit comprises a second multiplexer for receiving a first clock signal and a second clock signal.

4. The autodetect circuit of claim 1, wherein the counter is incremented whenever a reset command is provided by the state machine.

5. The autodetect circuit of claim 1, having an initial state wherein a first data signal is selected by the input multiplexer circuit to be transmitted on a first link.

6. The autodetect circuit of claim 5, wherein the initial state is changed based upon a predetermined count value of the counter.

7. The autodetect circuit of claim 6, wherein the predetermined count value is equal to two.

8. The autodetect circuit of claim 6, wherein the predetermined count value is equal to three.

9. The autodetect circuit of claim 6, wherein a second data signal is selected by the input multiplexer circuit to be transmitted on a second link in response to the change of the initial state.

10. The autodetect circuit of claim 1, wherein the state machine comprises a plurality of paths to an error reset state.

11. The autodetect circuit of claim 1, wherein the receiver and state machine are bidirectionally coupled.

12. The autodetect circuit of claim 1, wherein the state machine and transmitter are bidirectionally coupled.

13. The autodetect circuit of claim 1, further comprising an input FIFO coupled to the receiver.

14. The autodetect circuit of claim 1, further comprising an output FIFO coupled to the transmitter.

15. An autodetect method comprising:
providing a first link;
providing a second link;
detecting a plurality of transitions to an error reset state based upon the condition of an initially selected link;
counting the number of transitions to the error reset state; and
selecting the non-initially selected link when the number of transitions to the error reset state reaches a predetermined count value.

16. The autodetect method of claim 15, further comprising toggling back to the initially selected link until at least one of the links is in a run state or disabled.

17. The autodetect method of claim 15, wherein the predetermined count value is equal to two.

18. The autodetect method of claim 15, wherein the predetermined count value is equal to three.

19. An autodetect method comprising:
providing first and second data signals to a multiplexer;
initially selecting the first data signal for transmitting on a first link; and
switching the multiplexer based upon the condition of the first link so that the second data signal is transmitted on a second link.

20. The autodetect method of claim 19, wherein the condition of the first link comprises a plurality of error reset conditions associated with the first link.

21. The autodetect method of claim 19, wherein the plurality of error reset conditions is equal to two or three.

22. The autodetect method of claim 19, further comprising toggling between the first and second links until one of the first and second links is in a run state or disabled.

* * * * *